United States Patent
Oikawa (10) Patent No.: US 9,370,866 B2
(45) Date of Patent: Jun. 21, 2016

(54) WRIST UNIT OF INDUSTRIAL ROBOT (71) Applicant: FANUC CORPORATION, Minamitsuru-gun, Yamanashi (JP)

(72) Inventor: Akihiro Oikawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 511 days.

(21) Appl. No.: 13/845,372

(22) Filed: Mar. 18, 2013

(65) Prior Publication Data
US 2013/0319160 A1    Dec. 5, 2013

(30) Foreign Application Priority Data

May 30, 2012   (JP) .................................. 2012-123066

(51) Int. Cl.
*B25J 17/02*    (2006.01)
*B25J 9/10*     (2006.01)

(52) U.S. Cl.
CPC ................ *B25J 17/02* (2013.01); *B25J 9/1025* (2013.01); *B25J 17/0283* (2013.01); *Y10S 901/29* (2013.01); *Y10T 74/20335* (2015.01)

(58) Field of Classification Search
CPC .......... B25J 9/102; B25J 9/1025; B25J 17/02; B25J 17/0283
USPC ................. 74/490.03, 490.05, 490.06; 901/29
See application file for complete search history.

(56) References Cited

U.S. PATENT DOCUMENTS

| 4,657,472 A | * | 4/1987 | Zimmer ........................ 414/735 |
| 4,696,202 A | * | 9/1987 | Jinriki et al. ............... 74/490.06 |
| 4,736,645 A | * | 4/1988 | Zimmer ........................... 74/417 |
| 6,415,678 B1 | * | 7/2002 | Nada ........................... 74/490.06 |
| 2009/0036250 A1 | | 2/2009 | Koyama et al. |

FOREIGN PATENT DOCUMENTS

| CN | 85107385 A | 11/1986 |
| CN | 1178495 A | 4/1998 |
| CN | 1194604 A | 9/1998 |
| CN | 1871102 A | 11/2006 |
| JP | 6248489 A | 3/1987 |
| JP | 6248490 A | 3/1987 |
| JP | 1109094 A | 4/1989 |

(Continued)

OTHER PUBLICATIONS

JP Office Action mailed Jul. 23, 2013 for JP2012-123066.

(Continued)

*Primary Examiner* — William C Joyce
(74) *Attorney, Agent, or Firm* — Hauptman Ham, LLP (57) ABSTRACT

A wrist unit of an industrial robot including an eccentric rocking-type reduction gear. The eccentric rocking-type reduction gear includes a hollow forming part forming a hollow part along the rotation center axial line; a through shaft supported rotatably at the hollow forming part and passing through the hollow part to transmit a rotation from the third wrist drive motor from a first wrist element side to a second wrist element side; a plurality of crankshafts arranged around the through shaft and having input gears at ends of the side of the first wrist element; and a gear member provided rotatably centered about the rotation center axial line, the gear member having a first gear to which a rotational force from the second wrist drive motor is input and a second gear with which the input gears of the plurality of crankshafts engage.

5 Claims, 5 Drawing Sheets

(56) References Cited

FOREIGN PATENT DOCUMENTS

| | | |
|---|---|---|
| JP | 2007-211976 | 8/2007 |
| JP | 2007211976 A | 8/2007 |
| WO | 2007/091568 A1 | 8/2007 |
| WO | 2009098945 A1 | 8/2009 |

OTHER PUBLICATIONS

Office Action mailed Jul. 23, 2013 corresponds to Japanese patent application No. 2012-123066.

* cited by examiner

WRIST UNIT OF INDUSTRIAL ROBOT

RELATED APPLICATIONS

The present application is based on, and claims priority from, Japanese Application Number 2012-123066, filed May 30, 2012, the disclosure of which is hereby incorporated by reference herein in its entirety.

BACKGROUND OF THE INVENTION

1. Field of the Invention

The present invention relates to a wrist unit of an industrial robot which has three wrist elements.

2. Description of the Related Art

In a conventional known apparatus, an eccentric rocking-type reduction gear is provided at a joint of a wrist element of a front end side of a robot arm, and a torque of a motor is transmitted through the eccentric rocking-type reduction gear to the wrist element of the front end side. This type of apparatus is, for example, described in International Publication No. 2009/098945 (WO2009-098945A1). In the apparatus described in WO2009-098945A1, at the inside of the eccentric rocking-type reduction gear, a shaft for driving a joint at a front end side from the eccentric rocking-type reduction gear (hereinafter referred to as a "through shaft" for convenience) is passed through. Drive power from the motor is input to the through shaft via a gear. The eccentric rocking-type reduction gear has crankshafts at positions offset from the center axial line in the radial direction. One of the crankshafts has an input gear at its end. The input gear of the crankshaft engages with a motor gear which is arranged at a position offset from the crankshaft in the radial direction. Drive power from the motor is input through the motor gear and the input gear to the crankshaft.

In the apparatus described in WO2009-098945 A1, the center axial line of the opposite side gear (motor gear) which engages with the input gear of the reduction gear at the end of the crankshaft cannot be arranged on the same axial line as the center axial line of the reduction gear. It is for this reason that only one of the plurality of crankshafts is provided at its end with an input gear for use as an input shaft. In this configuration, the load concentrates at the crankshaft which has the input gear, so the crankshaft and the bearings which support it have to be configured so as to be able to withstand that load. For this reason, the crankshaft and the bearings which support it become larger in size and the reduction gear as a whole becomes larger in size. Furthermore, since the opposite side gear which engages with the input gear of the reduction gear cannot be arranged with its center axial line coaxial with the center axial line of the reduction gear, when positioning the base end side of the reduction gear, it is necessary to position the center axial line of the reduction gear and then match the phase of the reduction gear so that the input gear of the reduction gear and opposite side gear engage. For this reason, separate parts used for matching the phase become necessary, and assembly and disassembly of the reduction gear become complicated.

SUMMARY OF INVENTION

One aspect of the present invention is a wrist unit of an industrial robot including: a first wrist element supported rotatably about a first axial line at a first joint of a front end side of a robot arm; a second wrist element supported rotatably about a second axial line at a second joint of a front end side of the first wrist element, the second axial line not being on an extension of the first axial line and not being parallel to the first axial line; a third wrist element supported rotatably about a third axial line at a third joint of a front end side of the second wrist element, the third axial line not being on an extension of the second axial line and not being parallel to the second axial line; a second wrist drive motor provided at the first wrist element or the robot arm to drive the second wrist element; a third wrist drive motor provided at the first wrist element or the robot arm to drive the third wrist element; and an eccentric rocking-type reduction gear provided at the second joint so that a rotation center axial line matches with the second axial line to decelerate and transmit a rotation from the second wrist drive motor to the second wrist element. The eccentric rocking-type reduction gear includes: a hollow forming part forming a hollow part along the rotation center axial line; a through shaft supported rotatably at the hollow forming part and passing through the hollow part to transmit a rotation from the third wrist drive motor from a side of the first wrist element to a side of the second wrist element; a plurality of crankshafts arranged around the through shaft, the plurality of crankshafts having input gears at ends of the side of the first wrist element, and a gear member provided rotatably centered about the rotation center axial line, the gear member having a first gear to which a rotational force from the second wrist drive motor is input and a second gear with which the input gears of the plurality of crankshafts engage.

BRIEF DESCRIPTION OF THE DRAWINGS

The objects, features, and advantages of the present invention will become clearer from the following description of the embodiments given in relation to the attached drawings, in which.

DETAILED DESCRIPTION

Figure 1:
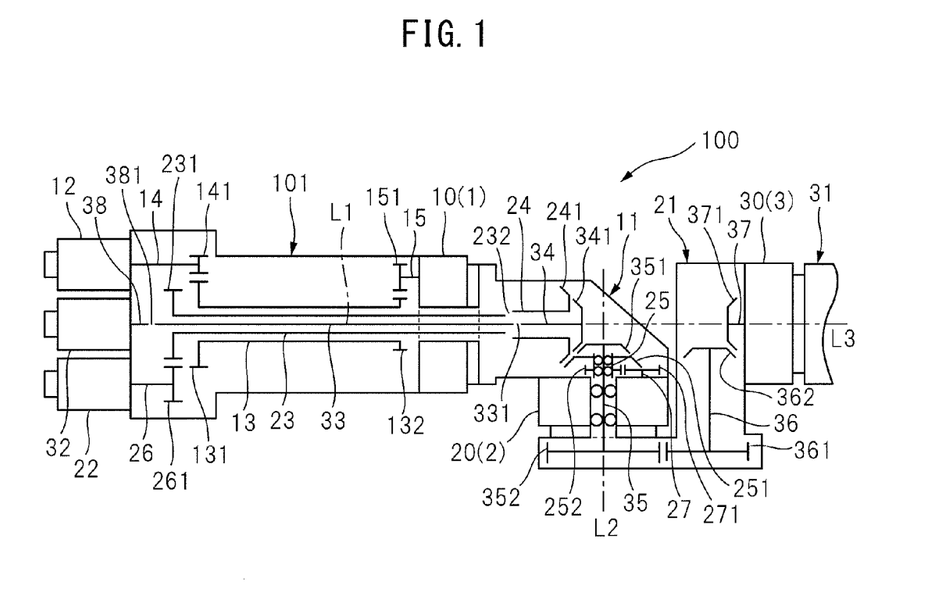
FIG. 1 is a view which shows the general configuration of a wrist unit of an industrial robot according to an embodiment of the present invention.

Hereinafter, an embodiment of the present invention will be explained with reference to FIG. 1 to FIG. 4. FIG. 1 is a view which shows the general configuration of a wrist unit of an industrial robot according to an embodiment of the present invention. The wrist unit 100 shown in FIG. 1 is, for example, applied to a multiarticulated industrial robot which has a robot arm supported rotatably at a base. Below, the base side will be referred to as the "base end side", while the direction moving away from the base (opposite side to base end side) will be referred to as the "front end side". The wrist unit 100 of the present embodiment is, for example, provided at the front end of the robot arm and holds or works a workpiece.

As shown in FIG. 1, the wrist unit 100 has a first wrist element 11 supported rotatably about a first axial line L1 at a first joint 10 of a front end of a robot arm 101, a second wrist element 21 supported rotatably about a second axial line L2 at a second joint 20 of a front end of the first wrist element 11, and a third wrist element 31 supported rotatably about a third axial line L3 at a third joint 30 of a front end of the second wrist element 21.

The first axial line L1 passes through the center of the robot arm 101, the second axial line L2 intersects the first axial line L1 by a predetermined angle (90°), and the third axial line L3 intersects the second axial line L2 by a predetermined angle (90°). In FIG. 1, although the first axial line L1 and the third axial line L3 are positioned on the same line, they need not be on the same line. The second axial line L2 need not intersect the first axial line L1 so long as not on an extension of the first axial line L1 and not parallel to the first axial line L1. The third axial line L3 need not intersect the second axial line L2 so long as not on an extension of the second axial line L2 and not parallel to the second axial line L2.

At the base end of the robot arm 101, a first motor 12 for driving the first wrist element 11, a second motor 22 for driving the second wrist element 21, and a third motor 32 for driving the third wrist element 31 are attached. At the first joint 10, second joint 20, and third joint 30, a first reduction gear 1, a second reduction gear 2, and a third reduction gear 3 are respectively provided. Among these, in particular, the first reduction gear 1 and the second reduction gear 2 are configured as eccentric rocking-type reduction gears. The detailed structure of the second reduction gear 2 will be explained later. The rotations from the first motor 12, second motor 22, and third motor 32 are decelerated by the first reduction gear 1, second reduction gear 2, and third reduction gear 3 respectively.

Inside the robot arm 101, a cylinder shaped shaft 13 extends along the first axial line L1. The shaft 13 is supported rotatably centered about the first axial line L1 at support parts (not shown) inside of the robot arm 101. Inside of the shaft 13, a cylinder shaped shaft 23 extends along the first axial line L1. The shaft 23 is supported rotatably centered about the first axial line L1 at the inner circumferential surface of the shaft 13. Inside of the shaft 23, a column shaped shaft 33 extends along the first axial line L1. The shaft 33 is supported rotatably centered about the first axial line L1 at the inner circumferential surface of the shaft 23.

Inside of the first wrist element 11, a cylinder shaped shaft 24 extends along the first axial line L1. The shaft 24 is supported rotatably centered about the first axial line L1 at support parts (not shown) inside of the first wrist element 11. Inside of the shaft 24, a column shaped shaft 34 extends along the first axial line L1. The shaft 34 is supported rotatably centered about the first axial line L1 at the inner circumferential surface of the shaft 24. Furthermore, inside of the first wrist element 11, a cylinder shaped shaft 25 extends along the second axial line L2. Inside the shaft 25, a column shaped shaft 35 extends. The shaft 35 is supported rotatably centered about the second axial line L2 by the second reduction gear 2. The shaft 25 is supported rotatably centered about the second axial line L2 at the outer circumferential surface of the shaft 35.

Inside of the second wrist element 21, at the side of the second reduction gear 2, a shaft 36 extends in parallel with the second axial line L2. The shaft 36 is supported rotatably at support parts (not shown) inside of the second wrist element 21. Furthermore, inside of the second wrist element 21, an input shaft 37 extends along the third axial line L3. The input shaft 37 is supported rotatably centered about the third axial line L3 by the third reduction gear 3.

At a front end of an output shaft 14 of the first motor 12, a flat gear 141 is attached. The flat gear 141 is engaged with a flat gear 131 attached to a base end of the shaft 13. At the front end of the shaft 13, a flat gear 132 is attached. The flat gear 132 is engaged with a flat gear 151 attached to an end of an input shaft 15 of the first reduction gear 1.

Due to this configuration, the rotation of the first motor 12 is input through a first transmission path comprised of the output shaft 14, flat gear 141, flat gear 131, shaft 13, flat gear 132, flat gear 151, and input shaft 15 to the first reduction gear 1 and is decelerated by the first reduction gear. This decelerated rotational force is used to drive the first wrist element 11. The rotation of the first motor 12 can be decelerated in the first transmission path as well.

At a front end of an output shaft 26 of the second motor 22, a flat gear 261 is attached. The flat gear 261 is engaged with a flat gear 231 attached to a base end of the shaft 23. The front end of the shaft 23 is provided with a spline 232. The shaft 23 is connected through the spline 232 to the shaft 24. At the front end of the shaft 24, a bevel gear 241 is attached. The bevel gear 241 is engaged with a bevel gear 251 attached to a base end of the shaft 25. At the front end of the shaft 25, a flat gear 252 is attached. The flat gear 252 is engaged with flat gears 271 attached to ends of input shafts 27 of the second reduction gear 2.

Due to this configuration, rotation of the second motor 22 is input through a second transmission path comprised of the output shaft 26, flat gear 261, flat gear 231, shaft 23, spline 232, shaft 24, bevel gear 241, bevel gear 251, shaft 25, flat gear 252, flat gears 271, and input shafts 27 to the second reduction gear 2 and is decelerated at the second reduction gear 2. This decelerated rotational force is used to drive the second wrist element 21. The rotation of the second motor 22 can be decelerated in the second transmission path as well.

At the front end of an output shaft of the third motor 32, a spline 381 is provided. The output shaft 38 is connected through the spline 381 to the base end of the shaft 33. At the front end of the shaft 33, a spline 331 is provided. The shaft 33 is connected through the spline 331 to the shaft 34. At the front end of the shaft 34, a bevel gear 341 is attached. The bevel gear 341 is engaged with a bevel gear 351 attached to a base end of the shaft 35. At a front end of the shaft 35, a flat gear 352 is attached. The flat gear 352 is engaged with a flat gear 361 attached to a base end of the shaft 36. At a front end of the shaft 36, a bevel gear 362 is attached. The bevel gear 362 is engaged with a bevel gear 371 attached to an end of the input shaft 37.

Due to this configuration, the rotation of the third motor 32 is input through a third transmission path comprised of the output shaft 38, spline 381, shaft 33, spline 331, shaft 34, bevel gear 341, bevel gear 351, shaft 35, flat gear 352, flat gear 361, shaft 36, bevel gear 362, bevel gear 371, and input shaft 37 to the third reduction gear 3 and is decelerated by the third reduction gear 3. This decelerated rotational force is used to drive the third wrist element 31. The rotation of the third motor 32 can be decelerated in the third transmission path as well.

Figure 2:
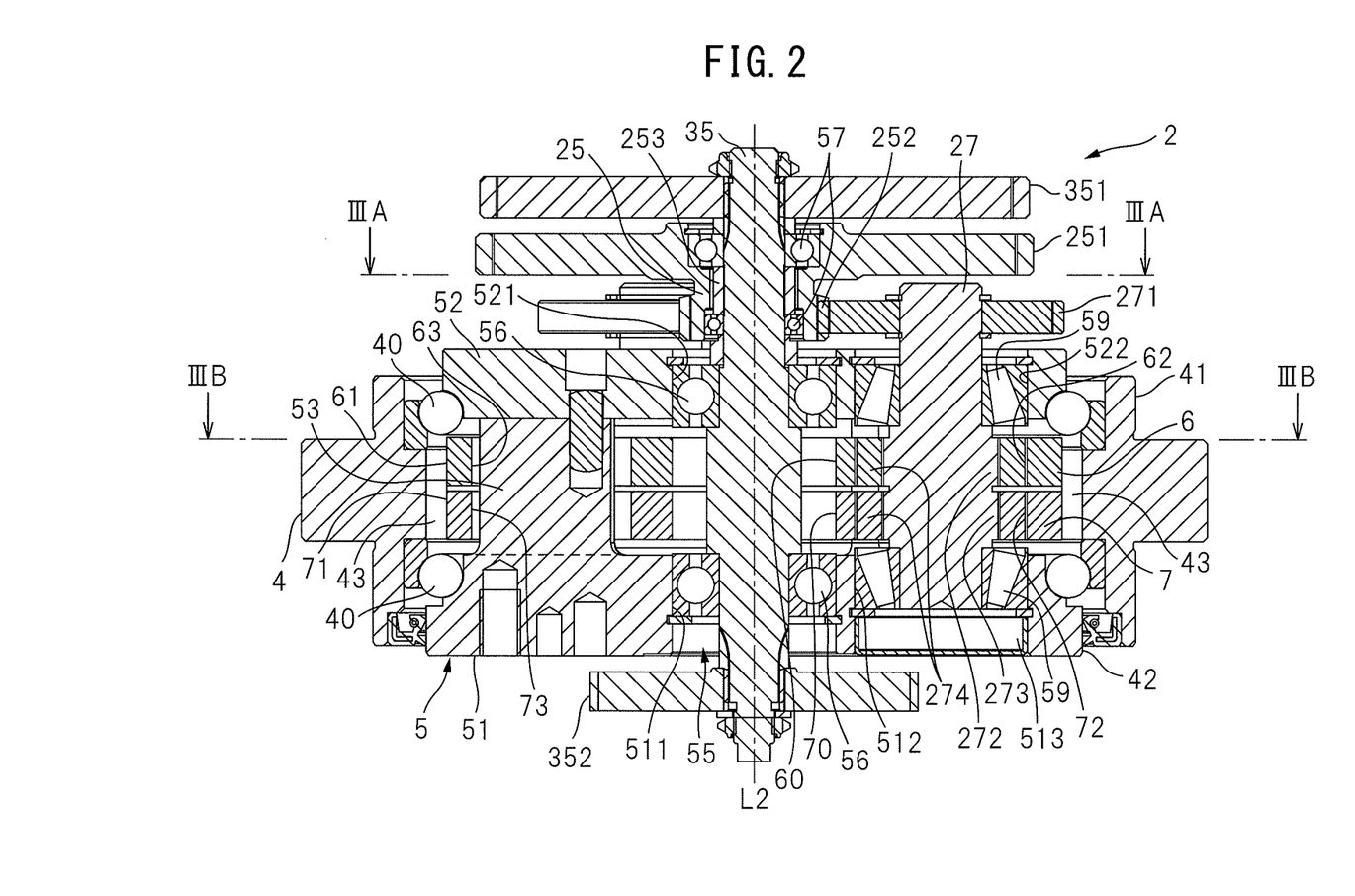
FIG. 2 is a cross-sectional view which shows the configuration of an eccentric rocking-type reduction gear which is included in a wrist unit of FIG. 1.
Figure 3A:
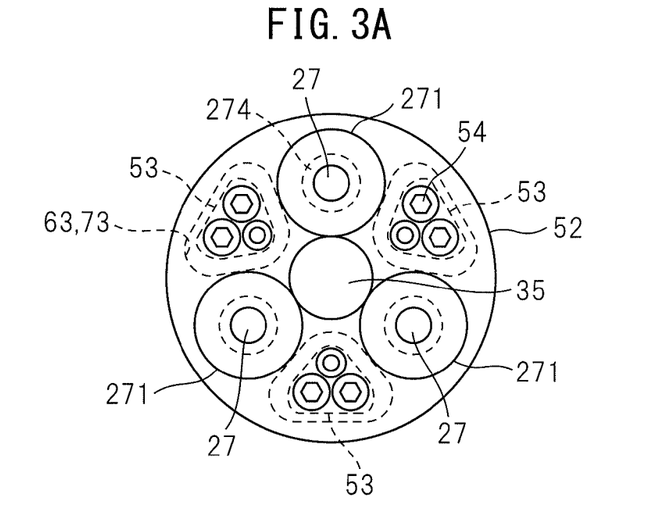
FIG. 3A is a cross-sectional view along the line IIIA-IIIA of FIG. 2.
Figure 3B:
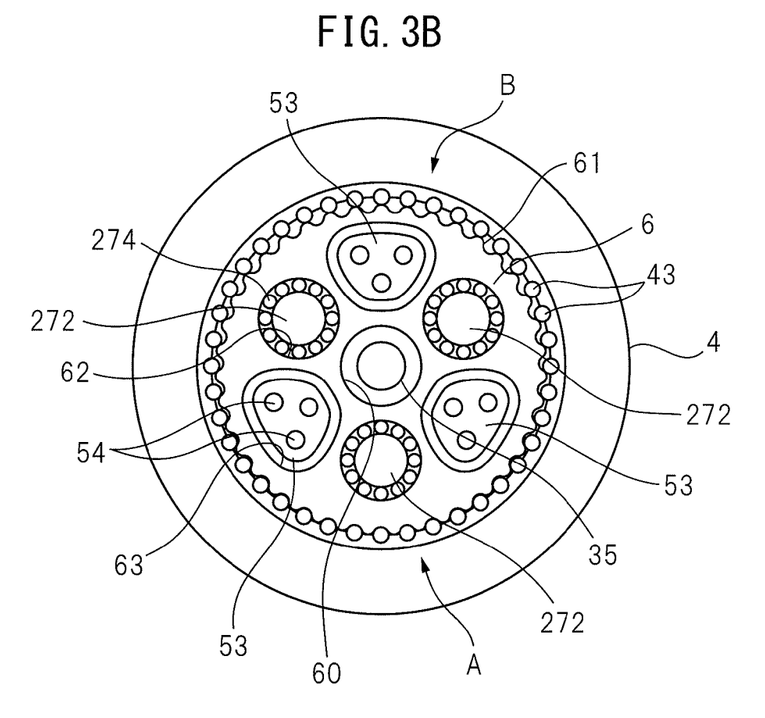
FIG. 3B is a cross-sectional view along the line IIIB-IIIB of FIG. 2.

The present embodiment has a particularly special feature in the second reduction gear 2 (eccentric rocking-type reduction gear). FIG. 2 is a cross-sectional view which shows the configuration of the second reduction gear 2, FIG. 3A is a cross-sectional view along the line IIIA-IIIA of FIG. 2, and FIG. 3B is a cross-sectional view along the line IIIB-IIIB of FIG. 2. Below, the direction parallel to the second axial line L2 will be defined as the "axial direction", the direction moving away from the second axial line L2 (radial direction of circle centered about axial line L2) will be defined as the "diametrical direction", and the peripheral direction of the circle centered about the second axial line L2 will be defined as the "peripheral direction".

As shown in FIGS. 2 and 3A, the second reduction gear 2 has a cylinder shaped or substantially cylinder shaped casing 4 and a carrier 5 which is supported rotatably inside of the casing 4 by a pair of main bearings 40. The casing 4 has a fitting part 41 which fits in the casing of the first wrist element 11 side at its outer circumferential surface. The carrier 5 has a first plate member 51 and a second plate member 52 which is separated from the first plate member 51 in the axial direction and is arranged facing the first plate member 51. At the surface of the first plate member 51 which faces the second plate member 52, columnar parts 53 are provided at equal intervals projecting out toward the second plate member 52 at three locations in the peripheral direction. Bolts 54 which pass through the second plate member 52 are screwed into the columnar parts 53 whereby the first plate member 51 and the second member 52 are integrally fastened. The carrier 5 has a fitting part 42 which fits in the casing of the second wrist element 21 side at the end of the first plate member 51.

At the center portions of the first plate member 51 and the second plate member 52, through holes 511, 521 are formed. At the inside of the second reduction gear 2, a hollow part 55 is formed along the second axial line (center axial line of reduction gear 2) L2. At the inner circumferential surfaces of the through holes 511, 521, bearings 56 are provided. The shaft 35 for driving the third wrist element passes through the hollow part 55 and is supported rotatably with respect to the carrier 5 by the pair of bearings 56. That is, the shaft 35 constitutes a through shaft.

At the outer circumferential surface of the through shaft 35, a pair of bearings 57 are attached at the outside from the pair of bearings 56 in the axial direction (base end side from second plate member 52). Due to the bearings 57, the shaft 25 for driving the second reduction gear is supported rotatably with respect to the shaft 35. At the second plate member 52 side of the shaft 25 (front end side), a flat gear 252 is attached, while at the opposite side of the second plate member 52 of the shaft 25 (base end side), a bevel gear 251 with a diameter larger than the flat gear 252 (in FIG. 2, for convenience, illustrated as a flat gear) is attached. That is, the shaft 25 is a cylindrical shaft which transmits the drive power input through the bevel gear 251 to the input shafts 27 through the flat gear 252. Between the pair of bearings 57, a cylinder shaped spacer 253 is interposed. The cylinder shaft 25 is arranged around the spacer 253.

Between the first plate member 51 and the second plate member 52, a pair of plate-shaped gear plates 6, 7 are arranged in parallel in the axial direction to be parallel to the first plate member 51 and the second plate member 52. At the outer circumferential surfaces of the gear plates 6, 7, external gears 61, 71 are formed. Facing the external gears 61, 71, at the inner circumferential surface of the casing 4, a plurality of internal tooth pins 43, of a number just one pin larger than the number of teeth of the external gears 61, 71, are provided at equal intervals in the peripheral direction (see FIG. 3B). The internal tooth pins 43 extend between the pair of spindle bearings 40 in the axial directions. While illustration is omitted, the gear plates 6, 7 engage with the internal tooth pins 43 in the state offset from each other by 180° in phase. That is, as shown in FIG. 3B, when the gear plate 6 engages with the internal tooth pins 43 of the part A, the gear plate 7 engages with the internal tooth pins 43 of the part B which is offset from the part A by 180° in phase, that is, at the opposite side from the part A.

As shown in FIG. 2, at the center portions of the gear plates 6, 7, through holes 60, 70 are formed. The through holes 60, 70 are passed through by the shaft 35. At one end of the through shaft 35 (base end), the bevel gear 351 (in FIG. 2, for convenience, illustrated as a flat gear) is attached at the outside from the bevel gear 251 in the axial direction (opposite side from second plate member 52), while at the other end (front end), the flat gear 352 is attached. The bevel gear 251 and the bevel gear 351 are arranged in parallel with each other.

The gear plates 6, 7 are formed with through holes 63, 73 at three locations in the peripheral direction corresponding to the columnar parts 53 of the first plate member 51. Inside the through holes 63, 73, the columnar parts 53 are inserted with clearance, that is, are loosely fit. Furthermore, the gear plates 6, 7 are formed with through holes 62, 72 at equal intervals at three locations in the peripheral direction between through holes 63, 73 adjoining in the peripheral direction. In the through holes 62, 72, input shafts 27 are respectively inserted. The input shafts 27 are crankshafts. Corresponding to the crankshafts 27, the first plate member 51 and the second plate member 52 are formed with through holes 512, 522 at three locations in the peripheral direction.

Ends of the crankshafts 27 at the first wrist element sides are passed through the through holes 522 of the second plate member 52. At the ends of the three crankshafts 27 which stick out from the second plate member 52, flat gears 271 are respectively attached. These three flat gears 271 engage with the center flat gear 252. The other ends of the crankshafts 27 at the second wrist element sides are inserted into through holes 512 of the first plate member 51. The through holes 512, 522 are provided with bearings 59. The crankshafts 27 are supported rotatably through the bearings 59 at the carrier 5 (first plate member 51, second plate member 52). At the through holes 512, covers 513 are attached from the outsides. The through holes 512 are closed by the covers 513.

Figure 3C:
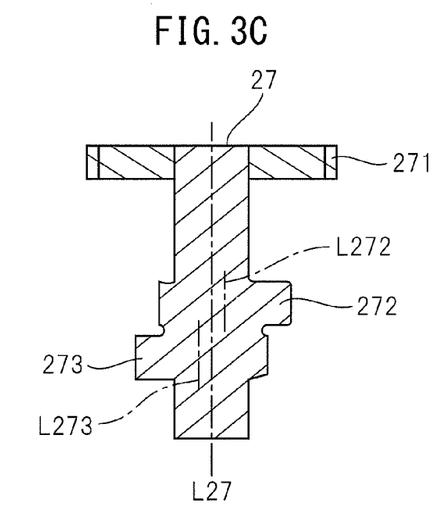
FIG. 3C is an enlarged cross-sectional view which schematically shows the configuration of a crankshaft of FIG. 2.

Each of the crankshafts 27 has two eccentric parts 272, 273 at the center in the axial direction. FIG. 3C is an enlarged cross-sectional view which generally shows the configuration of a crankshaft 27. As shown in FIG. 3C, the eccentric parts 272, 273 are offset from the center axial line L27 of the crankshaft 27 by equal amounts to each other and are offset in phase from each other by 180° in the peripheral direction. That is, the center axial lines L272, L273 of the eccentric parts 272, 273 are offset from the center axial line L27 of the crankshaft 27 in the diametrical direction by predetermined amounts, while the phases are offset from each other about the center axial line L27 by 180°. As shown in FIG. 2, the eccentric parts 272, 273 are supported rotatably through roller bearings 274 inside of the through holes 62, 72 of the gear plates 6, 7.

In the thus configured eccentric rocking-type reduction gear 2, if the bevel gear 251 of the cylindrical shaft 25 receives as input the drive power from the second motor 22 (FIG. 1), that drive power is transmitted through the flat gears 252, 271 to the three crankshafts 27 whereby these crankshafts 27 rotate (turn) centered about their center axial lines L27. Due to this, the eccentric parts 272, 273 eccentrically rotate inside the through holes 62, 72, and the gear plates 6, 7 eccentrically rotate (orbit) centered about the axial line L2 in the state offset in phase by 180°. Here, the number of the internal tooth pins 43 is one greater than the number of teeth of the external gears 61, 71, so the eccentric rotations of the gear plates 6, 7 cause the carrier 5 to rotate and the second wrist element 21 to be driven.

On the other hand, if the bevel gear 351 of the through shaft 35 receives as input the drive power from the third motor 32

(FIG. 1), that drive power is transmitted through the through shaft 35 to the flat gear 352 whereby the flat gear 352 rotates. Due to this, the drive power from the third motor 32 can be transmitted to the second wrist element 21 side through the hollow part 55 of the eccentric rocking-type reduction gear 2 efficiently in space. This drive power can be used to drive the third wrist element 31.

The above second reduction gear 2 is assembled in the state of FIG. 2 in advance, then attached to the casing of the first wrist element 11. At this time, the second reduction gear 2 is positioned by the fitting part 41 of the casing 4 with respect to the first wrist element 11. For this reason, the bevel gears 251, 351 which stick out from the base end side of the second reduction gear 2 can be precisely engaged with the bevel gears 241, 341 at the front end of the first wrist element 11. After that, the second wrist element 21 is attached to the second reduction gear 2. In this case, the second reduction gear 2 is positioned by the fitting part 42 of the carrier 5 with respect to the second wrist element 21. For this reason, the flat gear 352 which sticks out from the front end side of the second reduction gear 2 can be precisely engaged with the flat gear 361 of the base end of the second wrist element 21. Due to this, assembly and disassembly of the wrist unit 100 becomes easy and the wrist unit 100 can be easily maintained and inspected etc.

According to the present embodiment, the following function effects can be exhibited:

(1) The through holes 511, 521, 60, and 70 are used to form the hollow part 55 along the center axial line L2 of the eccentric rocking-type reduction gear 2, the through shaft 35 is supported rotatably passing through this hollow part 55 at the inside of the reduction gear 2, and the rotational force from the third motor 32 is transmitted from the first wrist element 11 side to the second wrist element 21 side. Furthermore, the eccentric rocking-type reduction gear 2 is provided with the plurality of crankshafts 27 which have flat gears 271 at first ends around the through shaft 35 offset from the axial line L2 in the diametrical direction, and the cylindrical shaft 25 which can rotate centered about the axial line L2. The cylinder shaft 25 is provided with the bevel gear 251 to which drive power from the second motor 22 is input, at one end thereof, and the flat gear 252 which engages with the flat gears 271 of the plurality of crankshafts 27, at the other end.

Due to this, it is possible to input drive power to the plurality of crankshafts 27 from the second motor 22 and possible to transmit drive power from the third motor 32 through the eccentric rocking-type reduction gear 2 to the flat gear 352 of the second wrist element 21. Furthermore, it is possible to arrange the second reduction gear 2, bevel gear 251, and bevel gear 351, which have to be positioned with respect to the first wrist element 11, with their rotation center axes all on the same line (L2), so when positioning the base end side of the second reduction gear 2 at the first wrist element 11, it is not necessary to match the reduction gear 2 in phase. That is, according to the present embodiment, it is possible to prevent the eccentric rocking-type reduction gear 2 which has the through shaft 35 for driving the third wrist element from becoming larger and to make the structure easy to assemble and disassemble.

Figure 4:
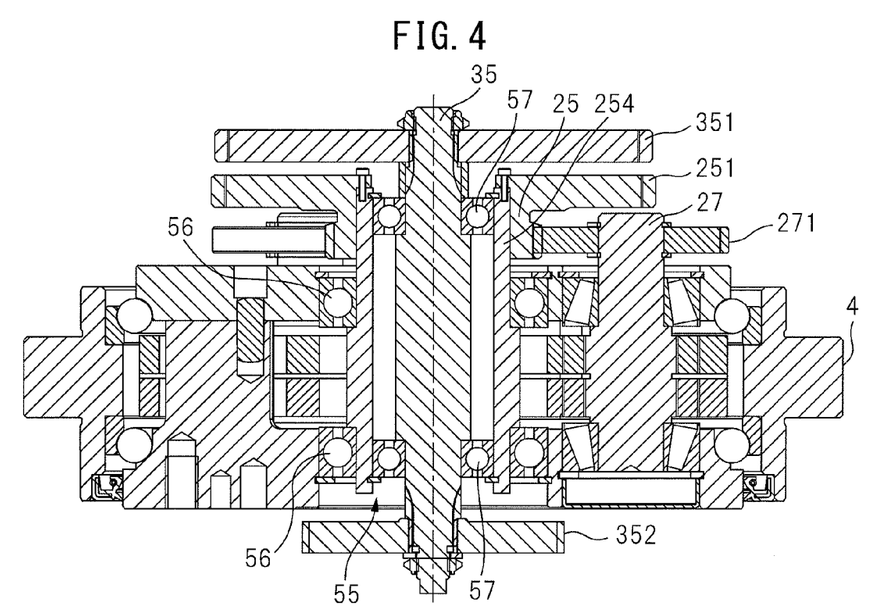
FIG. 4 is a view which shows a comparative example of FIG. 2.

(2) At the outer circumferential surface of the through shaft 35 at the outside from the hollow part 55 of the eccentric rocking-type reduction gear 2 in the axial direction, bearings 57 which support rotatably the cylinder shaft 25 are attached. Due to this, the only parts which are arranged inside of the hollow part 55 become the shaft 35 and the bearings 56, so the eccentric rocking-type reduction gear 2 can be reduced in size. As opposed to this, in the comparative example of the present embodiment, as shown in FIG. 4, at the outside of the through shaft 35 in the diametrical direction, a cylinder shaped shaft 254 is provided integrally with the cylinder shaft 25. If providing a pair of bearings 57 between this shaft 254 and the through shaft 35 to support rotatably the cylinder shaft 25, since the hollow part 55 has the shaft 35, bearings 57, shaft 254, and bearings 56 arranged in it, the hollow part 55 becomes enlarged and the eccentric rocking-type reduction gear 2 becomes larger in size.

(3) At one end of the through shaft 35, the bevel gear 351 which extends in the diametrical direction is attached. Between this bevel gear 351 and the flat gears 271 of the ends of the crankshafts 27, the bevel gear 251 which is provided on the cylinder shaft 25 is arranged so as to extend in the diametrical direction in parallel to the gears 351, 271. Due to this, the axial direction length of the eccentric rocking-type reduction gear 2 can be kept to the necessary minimum extent and the eccentric rocking-type reduction gear 2 can be compactly configured.

(Modifications)

Figure 5:
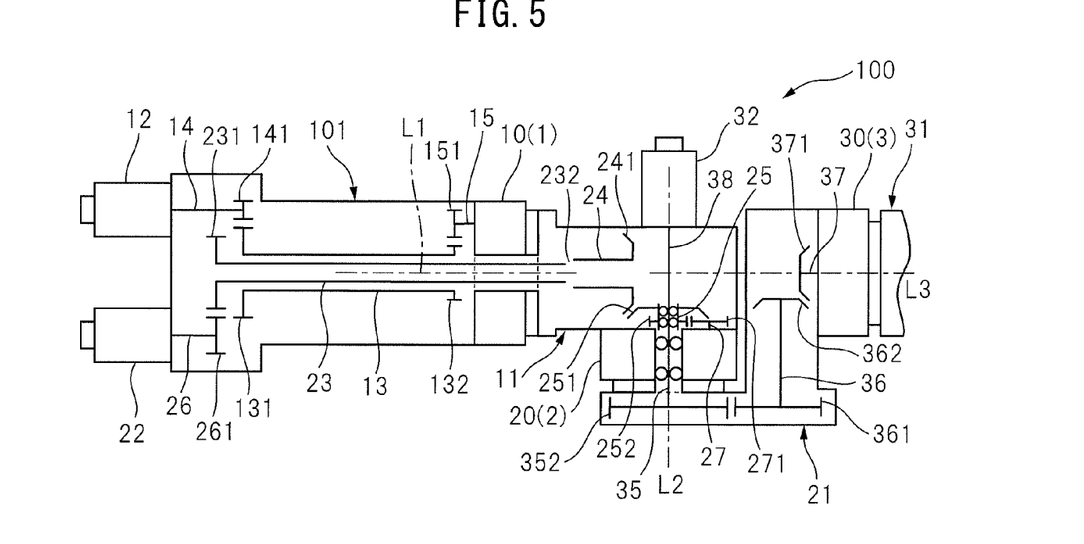
FIG. 5 is a view which shows a modification of FIG. 1.

In the above embodiment, although the first motor 12 (first wrist drive motor), second motor 22 (second wrist drive motor), and third motor 32 (third wrist drive motor) are respectively provided at the robot arm 101, at least one of the second motor 22 and the third motor 23 may also be provided at the first wrist element 11. FIG. 5 shows an example of provision of the third motor 32 at the first wrist element 11. In FIG. 5, the output shaft 38 of the third motor 32 extends on the second axial line L2, and the output shaft 38 is connected through a spline etc. to the shaft 35 which passes through the second reduction gear 2 (eccentric rocking-type reduction gear). By attaching the third motor 32 to the first wrist element 11 in this way, there is no need to form a third transmission path inside of the robot arm 101 and therefore the configuration of the robot arm 101 can be simplified.

Figure 6:
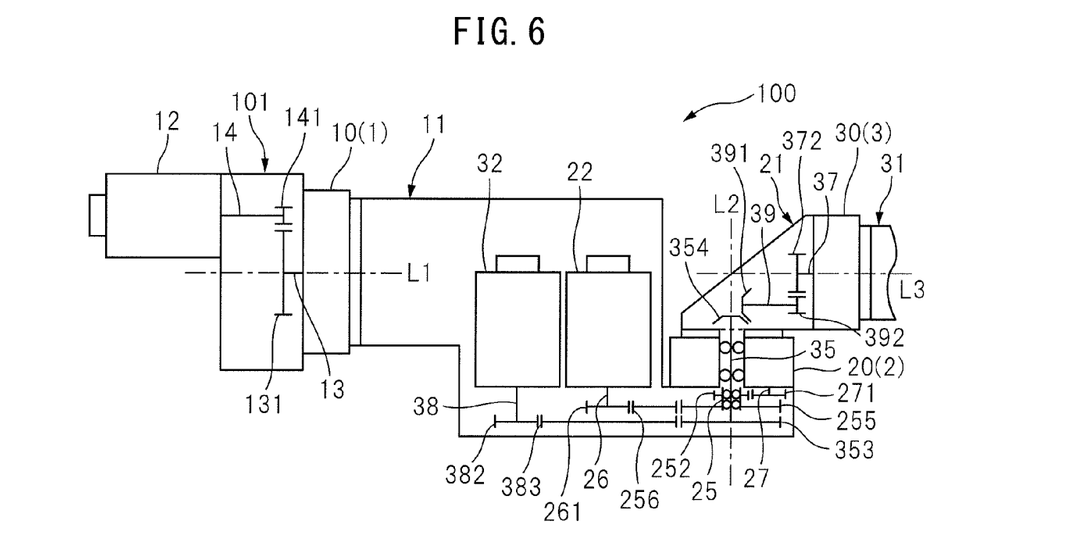
FIG. 6 is a view which shows another modification of FIG. 1.

FIG. 6 shows an example of provision of the second motor 22 and the third motor 32 inside of the first wrist element 11. In FIG. 6, the output shaft 26 of the second motor 22 extends in parallel with the second axial line L2. At the base end of the cylinder shaft 25 of the second reduction gear 2, not a bevel gear 251, but a flat gear 255 is attached. Between the flat gear 261 of the end of the output shaft 26 and the flat gear 255 of the end of the cylinder shaft 25, a flat gear 256 is arranged. Through the flat gear 256, drive power from the second motor 22 is transmitted to the second reduction gear 2.

Inside the first wrist element 11, the output shaft 38 of the third motor 32 extends in parallel to the second axial line L2. At the base end of the through shaft 35, not a bevel gear 351, but a flat gear 353 is attached. Between the flat gear 382 of the end of the output shaft 38 and the flat gear 353 of the end of the through shaft 35, a flat gear 383 is arranged. Through the flat gear 383, drive power from the third motor 32 is transmitted to the through shaft 35. In the second wrist element 21, at the end of the through shaft 35, not a flat gear 352, but a bevel gear 354 is attached. Inside the second wrist element 21, a shaft 39 extends in parallel with the third axial line L3. At the base end of the shaft 39, a bevel gear 391 is attached, while at the front end, a flat gear 392 is attached. At the input shaft 37, not a bevel gear 371, but a flat gear 372 is attached. Rotation of the through shaft 35 is input through the bevel gears 354, 391, shaft 39, and flat gears 392, 372 to the input shaft 37.

In the above embodiment (FIG. 1), although the first reduction gear 1 and the second reduction gear 2 are configured as eccentric rocking-type reduction gears, as shown in FIG. 6, it is also possible that only the second reduction gear 2 be configured as an eccentric rocking-type reduction gear. Although the through holes 511, 512 of the first plate member 51 and the second plate member 52 are used to form the hollow part 55 inside of the second reduction gear 2 along the rotation center axial line L2, the configuration of a hollow forming part is not limited to this. So long as supported rotatably at the hollow part 55 and so long as transmitting rotational force from the third motor 32 from the first wrist element 11 side to the second wrist element 21 side, the through shaft 35 can be configured in any way.

Although three crankshafts 27 are arranged around the through shaft 35, the number of the plurality of crankshafts 27 is not limited to this. So long as having gears 271 for inputting rotational force at the end of the first wrist element 11 sides (input gears), the crankshafts 27 can be configured in any way. Although a cylinder shaft 25 is provided rotatably through bearings 57 at the outer circumferential surface of the through shaft 35, so long as having a gear 251 to which rotational force from the second motor 22 is input (first gear) and a gear 252 with which the gears 271 of the plurality of crankshafts 27 engage (second gear) and being provided rotatably centered about the second axial line L2, the shaft 25 as a gear member can be configured in any way. The arrangement of the shaft 25 is also not limited to that explained above.

One or more of the above embodiment and the modifications may be freely combined.

According to the present invention, it is possible to input drive power from the motor to the through shaft which passes through the eccentric rocking-type reduction gear while inputting drive power from another motor to the plurality of crankshafts through a gear member. Further, it is possible to just position the reduction gear in its center axial line so as to assemble the reduction gear base end side.

While the present invention has been described with reference to the preferred embodiments thereof, it will be understood, by those skilled in the art, that various changes and modifications may be made thereto without departing from the scope of the appended claims.

The invention claimed is:

1. A wrist unit of an industrial robot, comprising:
   a first wrist element supported rotatably about a first axial line at a first joint of a front end side of a robot arm;
   a second wrist element supported rotatably about a second axial line at a second joint of a front end side of the first wrist element, the second axial line not being on an extension of the first axial line and not being parallel to the first axial line;
   a third wrist element supported rotatably about a third axial line at a third joint of a front end side of the second wrist element, the third axial line not being on an extension of the second axial line and not being parallel to the second axial line;
   a second wrist drive motor provided at the first wrist element or the robot arm to drive the second wrist element;
   a third wrist drive motor provided at the first wrist element or the robot arm to drive the third wrist element; and
   an eccentric rocking reduction gear provided at the second joint so that a rotation center axial line matches with the second axial line to decelerate and transmit a rotation from the second wrist drive motor to the second wrist element,
   wherein the eccentric rocking reduction gear comprises:
      a carrier forming a hollow part along the rotation center axial line;
      a through shaft (i) supported rotatably at the carrier by a pair of first bearings arranged inside the hollow part and (ii) passing through the hollow part to transmit a rotation from the third wrist drive motor from a side of the first wrist element to a side of the second wrist element, wherein
         at one end of the through shaft, a bevel gear, which is engaged with a bevel gear at the end of the first wrist element, is attached, and
         at the other end of the through shaft, a flat gear, which is engaged with a flat gear at the end of the second wrist element, is attached;
      a plurality of crankshafts arranged around the through shaft, the plurality of crankshafts having flat gears at ends of the side of the first wrist element; and
      a gear member provided rotatably centered about the rotation center axial line, the gear member having
         a bevel gear to which a rotational force from the second wrist drive motor is input, and
         a flat gear with which the flat gears of the plurality of crankshafts engage;
         wherein the gear member is rotatably supported by a pair of second bearings attached to an outer circumferential surface of the through shaft, the pair of second bearings arranged outside the hollow part in an axial direction along the rotation center axial line.

2. The wrist unit of claim 1, wherein the gear member is completely located outside the hollow part along the rotation center axial line.

3. The wrist unit of claim 1, wherein, along the rotation center axial line, the bevel gear, to which the rotational force from the second wrist drive motor is input, is located between (i) the flat gear, with which the flat gears of the plurality of crankshafts engage, and (ii) the bevel gear which is engaged with a bevel gear at the end of the first wrist element.

4. The wrist unit of claim 1, wherein the crankshafts are partially housed in the hollow part.

5. A wrist unit of an industrial robot, comprising:
   a first wrist element supported rotatably about a first axial line at a first joint of a front end side of a robot arm;
   a second wrist element supported rotatably about a second axial line at a second joint of a front end side of the first wrist element, the second axial line not being on an extension of the first axial line and not being parallel to the first axial line;
   a third wrist element supported rotatably about a third axial line at a third joint of a front end side of the second wrist element, the third axial line not being on an extension of the second axial line and not being parallel to the second axial line;
   a second wrist drive motor provided at the first wrist element or the robot arm to drive the second wrist element;
   a third wrist drive motor provided at the first wrist element or the robot arm to drive the third wrist element; and
   an eccentric rocking reduction gear provided at the second joint so that a rotation center axial line matches with the second axial line to decelerate and transmit a rotation from the second wrist drive motor to the second wrist element,
   wherein the eccentric rocking reduction gear comprises:
      a carrier forming a hollow part along the rotation center axial line;
      a through shaft (i) supported rotatably at the carrier by a pair of first bearings arranged inside the hollow part and (ii) passing through the hollow part to transmit a rotation from the third wrist drive motor from a side of the first wrist element to a side of the second wrist element, wherein at one end of the through shaft, a flat gear, which is engaged with a flat gear at the end of the first wrist element, is attached, and at the other end of the through shaft, a bevel gear, which is engaged with a bevel gear at the end of the second wrist element, is attached;

a plurality of crankshafts arranged around the through shaft, the plurality of crankshafts having flat gears at ends of the side of the first wrist element; and a gear member provided rotatably centered about the rotation center axial line, the gear member having a flat gear to which a rotational force from the second wrist drive motor is input, and a flat gear with which the flat gears of the plurality of crankshafts engage;

wherein the gear member is rotatably supported by a pair of second bearings attached to an outer circumferential surface of the through shaft, the pair of second bearings arranged outside the hollow part in an axial direction along the rotation center axial line.

* * * * *